United States Patent [19]

Goss

[11] Patent Number: 5,776,401
[45] Date of Patent: Jul. 7, 1998

[54] METHOD OF MANUFACTURING RUBBER MOLDS

[75] Inventor: Douglas J. Goss, North Kingstown, R.I.

[73] Assignee: Conley Casting Supply Corp., Warwick, R.I.

[21] Appl. No.: 929,245

[22] Filed: Sep. 10, 1997

Related U.S. Application Data

[62] Division of Ser. No. 548,576, Oct. 26, 1995, abandoned.

[51] Int. Cl.$^6$ ............................................. B29C 33/40
[52] U.S. Cl. ........................ 264/225; 425/177; 425/318; 425/DIG. 44
[58] Field of Search ........................... 264/225; 425/175, 425/177, 179, 180, 318, 451.9, 470, DIG. 44

[56] References Cited

U.S. PATENT DOCUMENTS

| D. 351,846 | 10/1994 | Goss | D15/135 |
|---|---|---|---|
| 756,652 | 4/1904 | Kern et al. | 425/175 |
| 1,603,262 | 10/1926 | Alden | 425/470 |
| 2,024,092 | 12/1935 | Cox | 425/DIG. 44 |
| 3,525,783 | 8/1970 | Prikkel, III | 264/225 |
| 3,600,489 | 8/1971 | Posner | 264/220 |
| 3,635,630 | 1/1972 | Greene | 425/175 |
| 3,850,559 | 11/1974 | Mintz et al. | 425/175 |
| 4,436,511 | 3/1984 | Michell, Sr. | 425/179 |
| 4,824,628 | 4/1989 | Curfman | 425/179 |
| 5,135,041 | 8/1992 | Goss | 425/DIG. 44 |
| 5,191,923 | 3/1993 | Goss | 425/425 |

*Primary Examiner*—Robert Davis
*Attorney, Agent, or Firm*—Salter & Michaelson

[57] ABSTRACT

A method for manufacturing rubber molds using a mold making apparatus having first and second discs of rubber mold material with models of articles to be cast positioned therebetween includes a bottom plate having a centrally located portion which engages the first sheet of rubber mold material and an outer reduced thickness flange, and a top plate which overlies the bottom plate. The top plate has a centrally located portion which engages the second sheet of rubber mold material and an outer reduced thickness flange corresponding to the flange of the bottom plate when disposed over the bottom plate. A plurality of thumb turn members are provided for tightening the top plate towards the bottom plate by hand. The arrangement is such that the models disposed between the first and second discs of rubber mold material form mold cavities therein.

7 Claims, 3 Drawing Sheets

METHOD OF MANUFACTURING RUBBER MOLDS

This application is a division of U.S. Pat. application Ser. No. 08/548,576, entitled "Apparatus and Method of Manufacturing Rubber Molds," filed Oct. 26, 1995, now abandoned.

BACKGROUND AND SUMMARY OF THE INVENTION

This invention relates generally to methods of making rubber molds, and more particularly to a method of manufacturing rubber molds which does not require a vulcanization press.

The conventional method of making inexpensive rubber molds of the type commonly used in centrifugal casting of jewelry products and the like uses a vulcanization press. Such a press is relatively heavy in construction due to the large component parts required to apply pressure and heat to the material forming the molds. Since the parts are relatively large, they are accordingly relatively expensive to manufacture, and thus expensive to purchase, especially for small manufacturers or the weekend hobbyist.

Reference can be made to U.S. Pat. No. 3,850,559 to Mintz et al. which discloses an apparatus for vulcanizing rubber molds. As described in the Mintz et al. patent, the term "vulcanization" is directed to the portion of the heat treatment cycle of the rubber mold where catalysts in the rubber effect cross-linkages in the polymer material to obtain desired finish properties. The apparatus of the Mintz et al. patent, which is in the form of a press, is typical in design in that it must be capable of applying heat and relatively large pressures on the rubber mold (e.g., between 500 and 1,500 psi). Thus, in order to accommodate and withstand such relatively large pressures, the apparatus must be sturdily built thereby increasing the cost of the press. This has the effect of increasing the cost of the rubber molds made from the press and thus the cost of the articles cast in the rubber molds. Moreover, since a heating unit must be built into the apparatus, the overall size and cost of the apparatus is further increased. Reference can also be made to U.S. Pat. No. Des. 351,846 to Goss for another vulcanization press.

U.S. Pat. No. 3,600,489 to Posner discloses a method for making a mold comprising an apparatus also having a pressure applying source and a heat source built into the apparatus.

There is presently a need for a method of making inexpensive rubber molds which eliminates the necessity of using a large and expensive vulcanization press, and which is useful for small scale operations and hobby use.

The instant invention provides an improved apparatus for manufacturing rubber molds having first and second discs of rubber mold material with models of articles to be cast positioned therebetween. The apparatus comprises a bottom plate having a centrally located portion adapted to engage the first sheet of rubber mold material and an outer reduced thickness flange, and a top plate adapted to overly the bottom plate. The top plate has a centrally located portion adapted to engage the second sheet of rubber mold material and an outer reduced thickness flange corresponding to the flange of the bottom plate when disposed over the bottom plate. A support ring is disposed between the bottom and top plates, the support ring being positioned outboard with respect to the centrally located portions of the bottom and top plates and adapted to engage the flanges of the bottom plate. Means is provided for tightening the top plate towards the bottom plate by hand. The arrangement is such that the models disposed between the first and second discs of rubber mold material form mold cavities therein.

More specifically, the tightening means comprises a plurality of threaded studs fixedly attached to the reduced flange of the bottom plate. The top plate has clearance openings formed therein aligned with the threaded studs for receiving the studs therethrough. A plurality of thumb turn members are threadably attached to the studs for applying pressure to the top plate. Thus, it should be noted that the tightening means of the present invention can be easily accomplished by hand, without the necessity of having a separate pressure source whether it is hydraulic or pneumatic.

A method for manufacturing a rubber mold having mating mold halves comprises the steps of: (a) providing a mold apparatus having a bottom plate, a top plate and means for tightening the top plate towards the bottom plate; (b) disposing two unvulcanized rubber discs between the bottom and top plates of the mold apparatus; (c) disposing models between the two unvulcanized rubber discs, the models defining mold cavities; (d) applying a nominal tightening force on the top plate by tightening the tightening means by hand so as to gently and evenly press the rubber discs together; (e) applying heat to the mold apparatus from an external heat source for softening the rubber discs; (f) increasing the tightening force on the top plate by hand until the top plate is incapable of being tightened any further, the top plate being maintained in parallel relation to the bottom plate while increasing the tightening force; and (g) curing the rubber discs.

Accordingly, among the several objects of the present invention are the provision of an improved apparatus for manufacturing rubber molds which is less costly to construct and purchase than existing vulcanization presses; the provision of such an apparatus which does not require hydraulic or pneumatic equipment; the provision of such an apparatus which can be utilized by small manufacturers of jewelry or by the weekend hobbyist; the provision of such an apparatus which can be heated by placing it upon an inexpensive heating unit, such as a hot plate; the provision of such an apparatus which produces high quality rubber molds; and the provision of such an apparatus which is simple in design and easy to use.

Also among the several objects of the present invention are the provision of an improved method which produces rubber molds in a cost-efficient manner; the provision of such a method which applies a nominal amount of pressure and therefore does not require hydraulic or pneumatic equipment; the provision of such a method which utilizes external heating source, such as a hot plate; and the provision of such a method which is easy to perform and produces reliable results.

Other objects, features and advantages of the invention shall become apparent as the description thereof proceeds when considered in connection with the accompanying illustrative drawings.

BRIEF DESCRIPTION OF THE DRAWINGS

In the drawings which illustrate the best mode presently contemplated for carrying out the present invention.

Corresponding reference numerals designate corresponding parts throughout the several views of the drawings.

DETAILED DESCRIPTION OF THE PREFERRED EMBODIMENT

Figure 1:
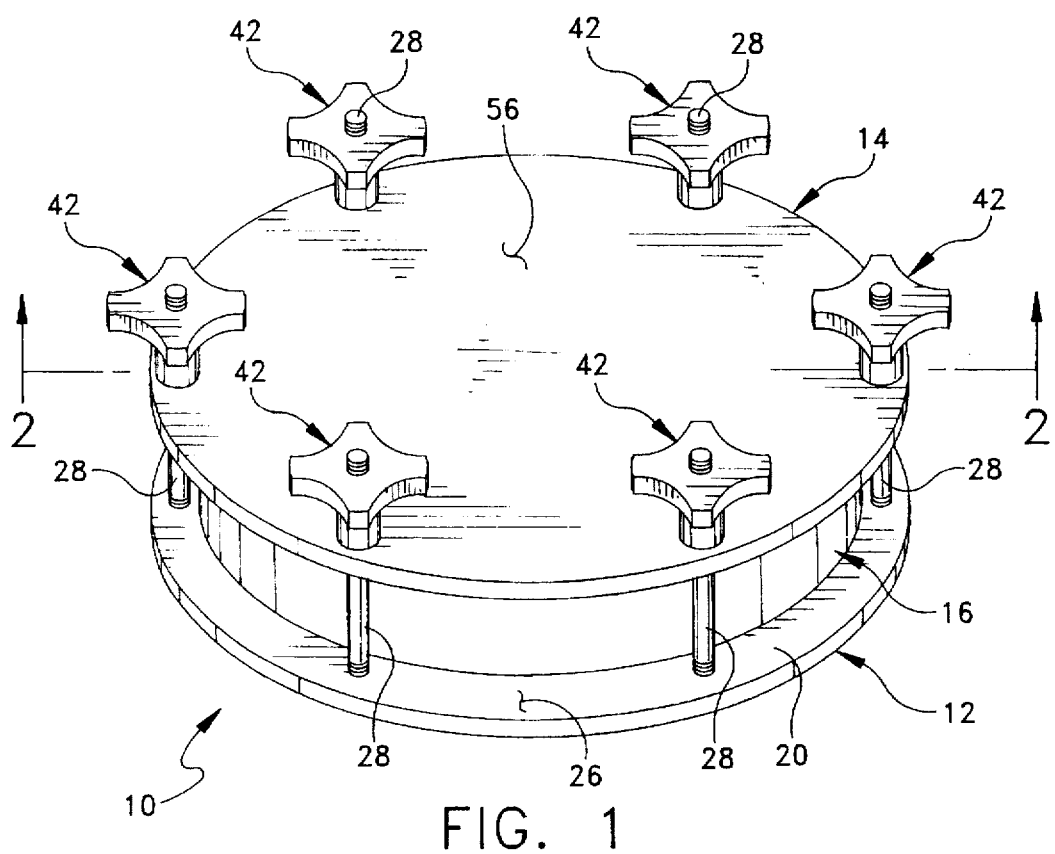
FIG. 1 is a front perspective view of an apparatus of the present invention for manufacturing rubber molds.

Referring now to the drawings, and particularly to FIG. 1, there is generally indicated at 10 an apparatus of the present invention for manufacturing a rubber mold. As will become apparent as the description of the apparatus 10 continues, it is especially suited for carrying out the method of the present invention for manufacturing a rubber mold which is used to cast small articles, such as jewelry. More specifically, the rubber molds made from the apparatus and method of the present invention are adapted to be used in a centrifugal casting machine (not shown) which spins the molds about an axis and pours molten material into the mold cavities formed in the molds. Centrifugal casting machines are well-known in the art.

Figure 4:
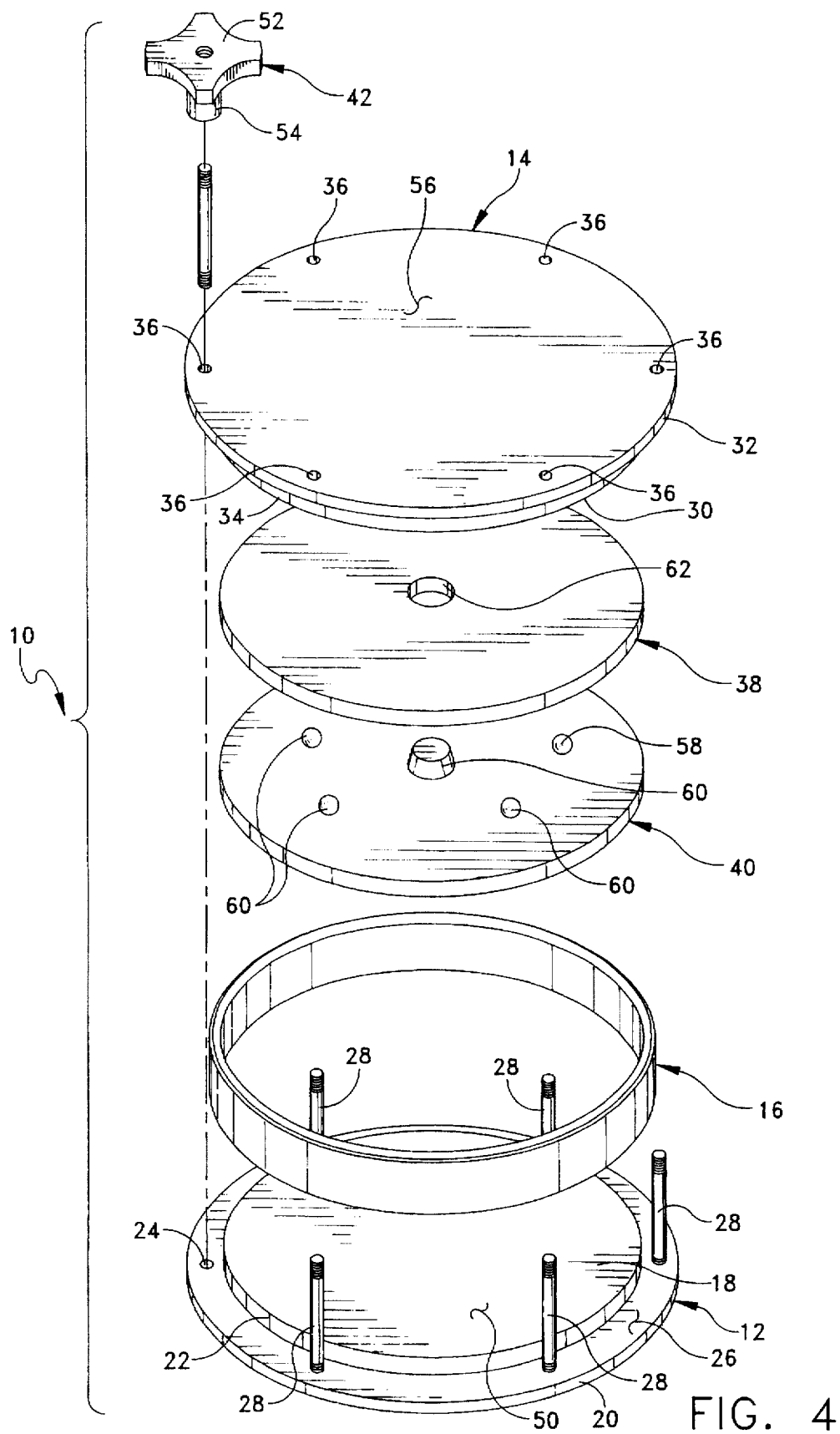
FIG. 4 is an exploded, front perspective view of the apparatus.

Referring generally to all of the drawings, and especially to FIG. 4, the apparatus 10 comprises a circularly-shaped bottom plate, generally indicated at 12, a circularly-shaped top plate, generally indicated at 14, and an annular support member or ring, generally indicated at 16, which is positioned between the bottom and top plates 12, 14 when in assembled relation. Preferably, the bottom plate 12, top plate 14 and support ring 16 are fabricated from rigid material capable of withstanding nominal heat and pressure, such as steel or the like.

The bottom plate 12 has a centrally located portion 18 and an outer reduced thickness flange 20 which is defined by a circumferential wall 22. The flange 20 has a plurality (e.g., six) tapped openings 24 formed therein on the upwardly facing surface 26 of the flange 20. These tapped openings 24 are provided for receiving threaded studs 28 in the manner illustrated in FIGS. 2 and 3. As shown, the threaded studs 28 have only their ends threaded; however, it should be understood that the entire stud 28 can be threaded as well.

The top plate 14 is nearly identically constructed as the bottom plate 12 in that it comprises a centrally located portion 30 and an outer reduced thickness flange 32 which is defined by a circumferential wall 34. The only difference between the top plate 14 from the bottom plate 12 is that the flange 32 of the top plate 14 has a plurality of clearance openings 36 formed therein instead of the tapped openings 24 of the bottom plate 12. These clearance openings 36 are in registry with the tapped openings 24 of the bottom plate 12 for receiving the threaded studs 28 therethrough in the manner illustrated in FIGS. 2 and 3. The purpose of this construction will become apparent as the detailed description of the apparatus 10 proceeds.

When in assembled condition, the support ring 16 is disposed between the bottom and top plates 12, 14 in a position where it is located outboard the circumferential walls 22, 34 of the bottom and top plates 12, 14, respectively. The support ring 16 is provided for encapsulating the outer peripheries of first and second discs of circularly-shaped, unvulcanized rubber mold material, indicated generally at 38 and 40, respectively, within the apparatus 10 during the formation of the rubber mold. Preferably, the first and second discs 38, 40 are fabricated from natural or synthetic rubber, silicone, black SBR, neoprene, or any other type of rubber that requires vulcanization. When assembled, the downwardly facing surface 48 of the top plate 14 engages the first disc 38 and the upwardly facing surface 50 of the bottom plate 12 engages the second disc 40.

Figure 2:
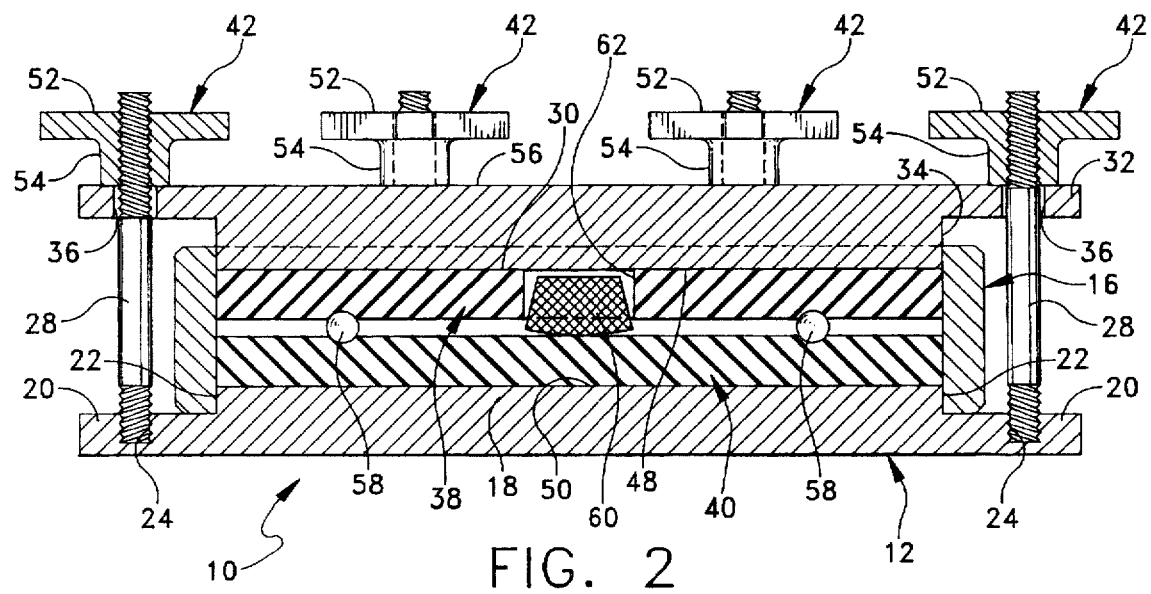
FIG. 2 is a cross-sectional view taken along line 2—2 of FIG. 1 of the apparatus before tightening and heating.
Figure 3:
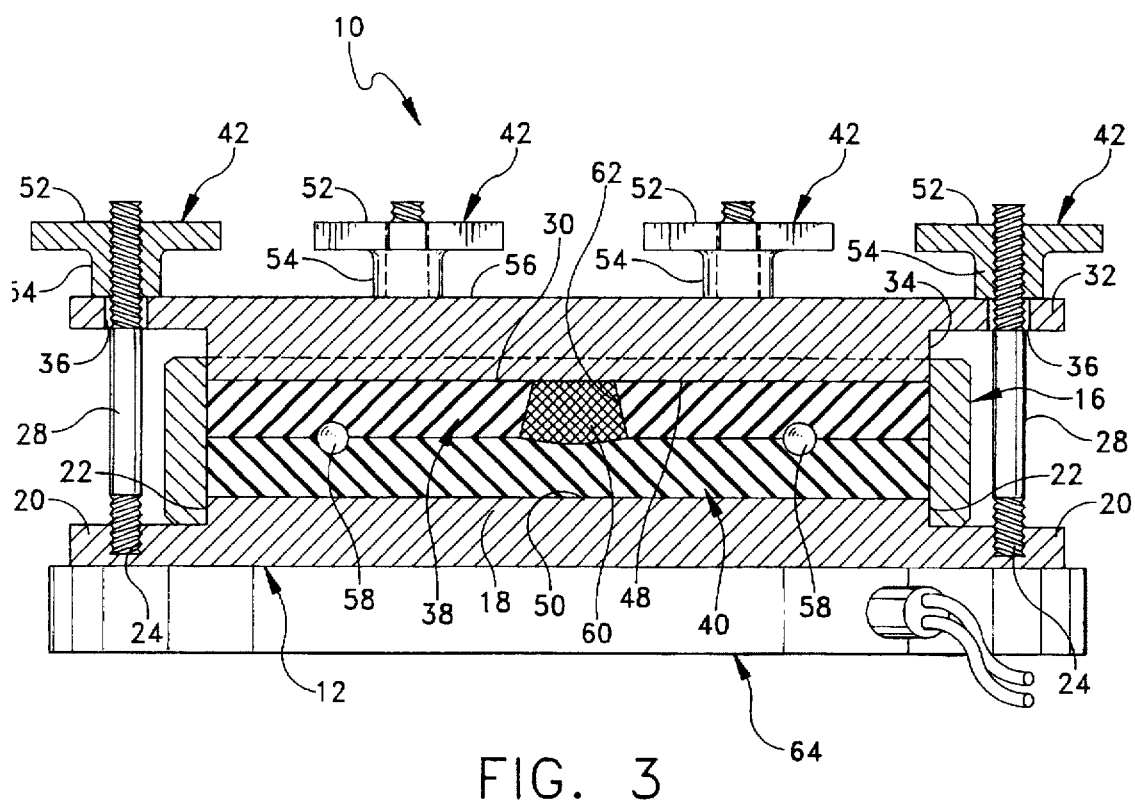
FIG. 3 is a cross-sectional view similar to FIG. 2 illustrating the apparatus after tightening and heating.

Provided for tightening the top plate 14 are a plurality of thumb turn members (broadly referred to, along with the threaded studs, as "tightening means"), each thumb turn member being generally indicated at 42. As shown, the thumb turn members 42 are threadably attached to the upper ends of the threaded studs 28. Each thumb turn member 42 includes an upper portion 52 adapted to be gripped by hand and a shank portion 54 having a downwardly facing surface which engages the upper surface 56 of the top plate 14. Thus, as illustrated in FIGS. 2 and 3, the thumb turn members 42 can be tightened so as to apply pressure on the first and second rubber discs 38, 40 during the processing of the rubber mold since they force the top plate 14 downwardly thereby sandwiching and compressing the first and second discs 38, 40 between the bottom and top plates 12, 14. Preferably a release agent, such as mica powder or the like, is applied to the opposed surfaces of discs 38, 40 to facilitate separation of the discs from each other after curing of the discs.

During use, the bottom plate 12 is provided with the threaded studs 28 secured within the tapped openings 24 of the flange 20. The support ring 16 is then disposed on the bottom plate 12 in such a manner that the support ring 16 is located outside the circumferential wall 22 of the bottom plate 12 and engages the surface 26 of the flange 20. The two discs of rubber material 38, 40 are then disposed within the support ring 16. As illustrated in FIGS. 2-4, models 58 of articles to be cast are disposed between the first and second discs 38, 40. The apparatus 10 of the present invention is especially suited for creating rubber molds for casting relatively small articles of jewelry, for example.

A trapezoidal-shaped plug 60 is placed on top of the second sheet 40 in a central location thereon. There is an opening 62 formed in the first sheet 38 for receiving the plug 60 therethrough in the manner illustrated in FIGS. 2 and 3. The purpose for the plug 60 is to provide a pour opening through which molten material is delivered to the cavities formed by the models during casting of the article. After the rubber molds are processed, suitable gating can be formed within the rubber molds so as to effect the delivery of molten material to the cavities.

The top plate 14 is then disposed over the bottom plate 12 and support ring 16 in such a position that the clearance openings 36 of the top plate 14 are in registry with the threaded studs 28. The thumb turn members 42 are next threadably attached to the upper ends of the studs 28 for applying pressure to the top plate 14.

The first step of the method of the present invention is to provide the apparatus 10 as previously described, to include the bottom plate 12, top plate 14, support ring 16, studs 28 and thumb turn members 42 for tightening the assembled parts. Next, two unvulcanized rubber discs (e.g., 38, 40) are disposed between the bottom and top plates 12, 14 of the apparatus 10 in the manner illustrated in FIG. 4. The models 58 are placed between the first and second rubber discs 38, 40 before inserting the discs into the apparatus 10 wherein the models define mold cavities of a finished mold. The plug 60 is also disposed between the first and second rubber discs 38, 40, the plug 60 extending through the opening 62 formed in the first sheet 38.

By tightening the assembled thumb turn members 42, a nominal tightening force is applied on the top plate 14. An important aspect of the present invention is that the tightening of the plates 12, 14 together can be achieved by hand so as to gently press the first and second rubber discs 38, 40 together. No external pressure source, such as hydraulics or pneumatics, need be supplied. In order to ensure that uniform pressure is being applied to the first and second discs 38, 40, calipers (not shown) can be used to measure the distance between the bottom and top plates 12, 14 around their outer peripheries. By measuring a consistent distance between the plates, a uniform pressure is ensured. The bottom and top plates 12, 14, along with the support ring 16, combine to completely encapsulate the first and second discs 38, 40 and prevent them from expanding during the processing of the discs (i.e., after heat is applied thereto).

Next, heat is applied to the apparatus 10 from an external heat source for softening the rubber discs 38, 40 and increasing the pressure applied to them. More specifically, the apparatus 10 is heated to approximately 130° F. by an external heat source, such as by a hot plate of conventional construction. The hot plate is generally indicated by reference numeral 64 in FIG. 3. Other heat sources can be provided as well, such as an oven. However, the apparatus 10 of the present invention is especially sized and dimensioned for being placed on the hot plate 64.

After heating the apparatus 10 having the discs 38, 40 therein to approximately 130° F., the tightening force of the top plate 14 is increased until no more force can be applied by hand to the first and second rubber discs 38, 40. This can be achieved by turning the thumb turn members 42 by hand until they are incapable of turning any further. As mentioned above, the top plate 14 is maintained in parallel relation to the bottom plate 12 while increasing the tightening force so as to ensure uniform pressure on the top plate 14. The above-referenced calipers can be used to check this. Preferably, the increasing of the tightening force is achieved over a period of approximately five minutes.

The discs of rubber material 38, 40 defining the mold halves of the rubber mold are then cured by increasing the heat to approximately 300° F. for causing the rubber discs 38, 40 to want to expand, and maintaining the increased heat for approximately two hours. Since the discs 38, 40 cannot expand, internal stresses in the discs are created which simulate vulcanization. In the curing method, after heating the apparatus 10 to 300° F. for two hours, preferably the apparatus 10 is allowed to cool to approximately 150°-200° F. for approximately one half an hour.

After the rubber mold halves are cured, the top plate 14 is removed from the assembly by unscrewing the thumb turn members 42, which enables the top plate 14 and the rubber discs 38, 40 to be removed from the bottom plate 12 and support ring 16 of the apparatus 10. The first and second discs 38, 40 forming the mating mold halves are then separated so as to remove the models 58 and the plug 60 disposed in between. After the necessary gating is formed in the mold halves, they are then ready for centrifugal casting of articles.

It should be appreciated that the apparatus 10 of the present invention, since pressure is applied by hand and heat is applied by an external source, is simpler in design and thus more economical to manufacture than vulcanization presses of the prior art. Moreover, the method of the present invention is also easier to follow and can be utilized by small manufacturers of jewelry or by the weekend hobbyist.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A method for manufacturing a rubber mold having mating mold halves comprising the steps of:
    (a) providing a mold apparatus having a bottom plate, a top plate and means for tightening the top plate towards the bottom plate;
    (b) disposing two unvulcanized rubber discs between the bottom and top plates of the mold apparatus;
    (c) disposing models between the two unvulcanized rubber discs, said models defining mold cavities;
    (d) applying a nominal tightening force on the top plate by tightening said tightening means by hand so as to gently press the rubber discs together;
    (e) applying heat to said mold apparatus from an external heat source for softening the rubber discs;
    (f) increasing the tightening force on the top plate by hand until the top plate is incapable of being tightened any further, said top plate being maintained in parallel relation to said bottom plate while increasing said tightening force; and
    (g) curing the rubber discs.

2. A method as set forth in claim 1, said mold apparatus being heated to approximately 130° F.

3. A method as set forth in claim 1, said step of increasing the tightening force being achieved over a period of approximately five minutes.

4. A method as set forth in claim 1, said external heat source comprising a hot plate.

5. A method as set forth in claim 1, said curing step comprising the steps of:
    increasing the heat to approximately 300° F. for causing the rubber discs want to expand; and
    maintaining the increased heat for approximately two hours.

6. A method as set forth in claim 5, said curing step further comprising the step of allowing the mold apparatus to cool to approximately 150°-200° F. for approximately one half an hour.

7. A method as set forth in claim 1, after said curing step, further comprising the steps of:
    removing the top plate from the mold apparatus;
    removing the rubber discs from the mold apparatus; and
    separating the rubber discs and removing the models therefrom.

* * * * *